United States Patent [19]

Matsui

[11] 4,321,136

[45] Mar. 23, 1982

[54] FUEL FILTERING DEVICE FOR ENGINE

[75] Inventor: Katsuhiko Matsui, Yokohama, Japan

[73] Assignee: Nissan Motor Co., Ltd., Yokohama, Japan

[21] Appl. No.: 160,058

[22] Filed: Jun. 16, 1980

[30] Foreign Application Priority Data

Jun. 21, 1979 [JP] Japan .................. 54-84145[U]

[51] Int. Cl.³ ............................................ B01D 27/10
[52] U.S. Cl. .................................. 210/86; 210/149; 210/186
[58] Field of Search ............... 210/149, 184, 186, 86

[56] References Cited

U.S. PATENT DOCUMENTS 2,218,715 10/1940 MacCormick .................. 210/186
3,235,084 2/1966 King et al. ..................... 210/149
3,568,835 3/1971 Hansen.
4,091,265 5/1978 Richards et al. ............... 210/184 X Primary Examiner—John Adee
Attorney, Agent, or Firm—Thompson, Birch, Gauthier & Samuels

[57] ABSTRACT

A fuel filtering device, having a filtering element for filtering engine fuel, wherein a temperature sensing device is provided for sensing fuel temperature adjacent to the filtering element, and wherein a device is provided for heating the fuel in response to the temperature sensed by the temperature sensing device, thereby preventing clogging of the filtering element with wax like material which will be produced in the fuel under low temperature conditions.

8 Claims, 5 Drawing Figures 4,321,136

FUEL FILTERING DEVICE FOR ENGINE

BACKGROUND OF THE INVENTION

This invention relates to a fuel filtering device used for a Diesel engine mounted on a motor vehicle.

In connection with a Diesel engine, the engine mounted on a motor vehicle is operated on a so-called light oil which is usually higher in pour point than gasoline or petrol. Accordingly, the light oil will lose its fluidity and produce wax like material at temperatures lower than $-10°$ C., which wax like material will become attached onto the surface of a filtering element of a fuel filter to clog the filtering element. Such clogging may also rise in the case where the fuel filter is installed at a section of the motor vehicle is liable to be cooled with cold air during vehicle operation. The filter element clogging increases the flow resistance of fuel passing through the filter element, and leads finally to a serious drawback in that the fuel will not be supplied smoothly to the engine.

SUMMARY OF THE INVENTION

In accordance with present invention, a fuel filtering device for an engine, having a filtering element, is provided with a device for sensing the temperature of fuel upstream of the filtering element, and a device is also provided for heating the fuel upstream of the filtering element in response to the temperature sensed by the sensing device. Preferably, the sensing and the heating devices form part of an electric circuit, wherein the sensing device is a temperature sensitive switch arranged to close the circuit when the temperature is below a predetermined level, and the heating device is an electric heating member arranged to heat the fuel in the fuel filtering device when supplied with electric current upon completion of the electric circuit.

An object of the present invention is to provide an improved fuel filtering device for an internal combustion engine, by which the engine can stably operate without causing engine running deterioration, power output shortage and engine stall.

Another object of the present invention is to provide an improved fuel filtering device for a Diesel engine, whereby a sufficient amount of fuel can be supplied to the engine even under low temperature condition.

A further object of the present invention is to provide an improved fuel filtering device for a Diesel engine, wherein the filtering element does not become clogged with wax like material which ordinarily would be produced in fuel under low temperature conditions.

BRIEF DESCRIPTION OF THE DRAWINGS

The features and advantages of the fuel filtering device according to the present invention will be more clearly appreciated from the following description taken in conjunction with the accompanying drawings in which like reference numerals designate like parts and elements throughout all the embodiments, and in which.

DETAILED DESCRIPTION OF THE EMBODIMENTS OF THE INVENTION

Figure 1:
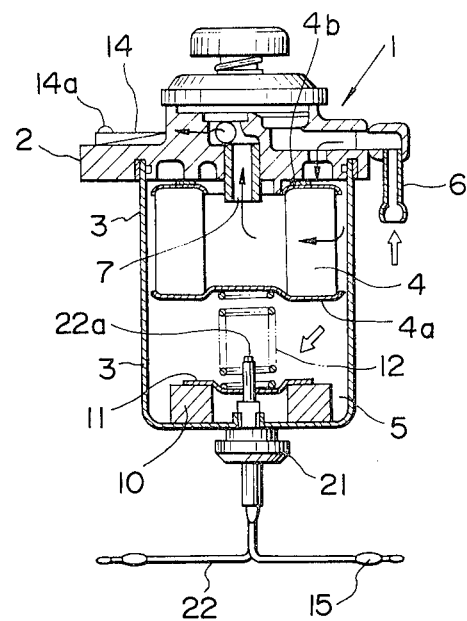
FIG. 1 is a cross-sectional view of an embodiment of a fuel filtering device in accordance with the present invention.
Figure 2:
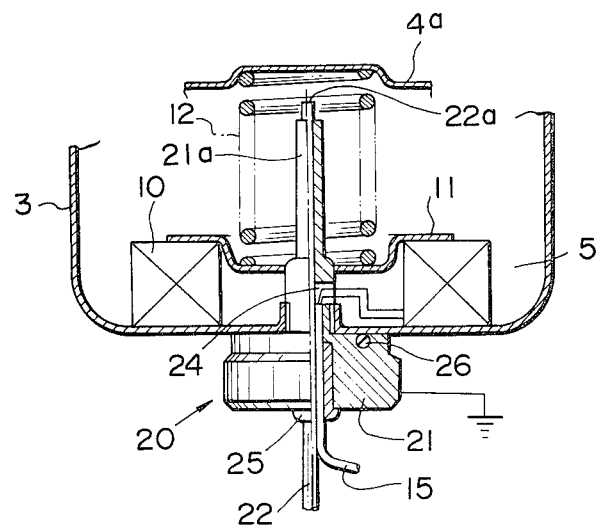
FIG. 2 is an enlarged section view of an essential part of the device of FIG. 1.

Referring now to FIGS. 1 and 2, there is shown an embodiment of a fuel filtering device used for a Diesel engine mounted on a motor vehicle (not shown), in accordance with the present invention. The fuel filtering device comprises a fuel filter assembly 1 which is constructed by an upper cover 2 to which the upper end of a filter casing 3 made of glass or steel plate is fixed by a suitable means such as a threaded connection. A filtering element 4 including, for example, an annular pleated paper is disposed at an upper section of a space defined by the upper cover 2 and the filter casing 3, and the lower section of the space constitutes a water sump 5 in which water separated from fuel is collected. The fuel supplied under pressure from a fuel pump (not shown) is introduced through a fuel inlet 6 to a space (a dirty side) defined between the inner surface of the filter casing 3 and the outer surface of the filtering element 4, which fuel is filtered to remove dusts and the like contained therein during passage through the filtering element 4, and then flows through a space (a clean side) defined inside of the filtering element 4 and a fuel outlet 7 formed in the upper cover 2 to be supplied to the engine (not shown). It will be understood that the fuel introduced to the above-mentioned dirty side is also further introduced to the water sump 5 held therein, so that water and impurities will be settled out by virtue of difference in specific gravity from fuel so as to separate them from the fuel.

An annular heating member 10 including, for example, a known Positive Temperature Coefficient (PTC) heating element is disposed to be seated on the inner bottom wall surface of the filter casing 3 in a manner that the heating member is coaxial with the filter casing 3. A spring 12 is disposed between a lower cover plate 4a of the filtering element 4 and an annular spring retainer 11 mounted on the annular surface of the heating element 10 so as to force the filtering element to contact through a sealing member 4b to the bottom surface of the upper cover 2 and additionally force the heating member 10 to contact to the inner bottom wall surface of the filter casing 3.

Figure 3:
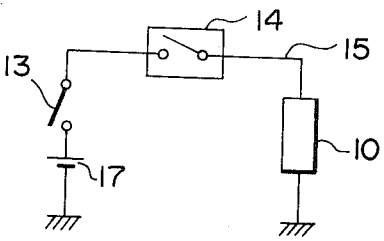
FIG. 3 is a circuit diagram for supplying electric current to a heating member used in the device of FIG. 1.

An electric circuit for supplying electric current to the heating member 10 is shown in FIG. 3, which circuit is a series circuit including an electric power source 17, a manually operated switch 13 disposed, for example, at an instrument panel (not shown) of the vehicle, a temperature sensitive switch 14 such as a bimetal switch securely disposed on the upper cover 2 with a small screw 14a so as to sense the temperature of the fuel filter assembly 1 or of ambient air around the filter assembly, and the heating member 10. The manually operated switch 13 is switched on by a driver of the vehicle when he recognizes the necessity of heating fuel, and accordingly a known timer may be additionally used to set a time period for flowing electric current to the heating member 10. The bimetal switch 14 serves as a so-called normally open switch, and arranged to be in ON position to pass the electric current therethrough when the temperature of the fuel filter assembly 1 is at a predetermined low level such as 0° C. or lower. It will be appreciated that the temperature sensitive switch may be operated in response to the fuel temperature at a section adjacent to the filtering element 4, an engine coolant temperature, or the temperature of ambient air.

A water level detecting device 20 is provided to detect the level of water accumulated in the water sump 5. A grounded terminal member 21 of the device 20 is secured to the filter casing 3 in such a manner that an upwardly or vertically elongate section 21a of the terminal member is threaded into the central bottom section of the filter casing 3. The elongate section 21a of the terminal 21 is extended upwardly by a predetermined length or distance from the inner bottom surface of the filter casing 3 as shown, and a lead 22 is disposed along the axis of the elongate section of the terminal 20 so as to protrude through the elongate section 21a. The lead 22 is connected to an electric power source and covered with an insulating material to maintain an electric insulation, leaving a top end 22a exposed to the space of the water sump 5. With this construction of the water level detecting device 20, when the exposed top end 22a of the lead 22 is emersed in the fuel, the electrical connection between the exposed top end 22a of the lead 22 and the grounded terminal member 21 is blocked by an insulation effect of the fuels, whereas when the exposed top end 22a detects water, the electrical connection of the exposed top end 22a and the grounded terminal 21 is established by an electrical conductive effect of water so as to cause electric current flow from the top end 22a to the grounded terminal 21. Accordingly, by sensing the electric current flowing through the lead 22, it becomes possible to detect when a predetermined amount of water has settled in the case 3. When the predetermined sedimented amount of water is thus detected, the grounded terminal member 21 is rotated to remove it from the filter case 3 to drain water accumulated in the water sump 5.

Turning to the heating member 10, a lead 15 from the heating member 10 is disposed within an elongate hole (no numeral) formed in the grounded terminal member 21, and drawn out of the terminal member 21 together with the lead 22. It will be understood that the leads 15 and 22 are electrically insulated from each other, and they are secured together with the grounded terminal member 21 by an electrically insulative adhesive. The reference numeral 26 denotes an O ring to provide a liquid-tight seal between the grounded terminal member 21 and the filter casing 3. Otherwise, the grounded terminal member 21 may be fixed to the filter casing 3 with an adhesive.

With the thus arranged fuel filtering device, when the ambient temperature is below 0° C., the bimetal switch 14 senses such a low temperature and closes to its ON position. Additionally, when the driver closes the switch 13, electric current is supplied from the electric power source 17 through the lead 15 to the heating member 10 so that the PTC heating element is heated. Therefore, the fuel present in the filter casing 3 is heated to raise its temperature, which can maintain the fluidity of the fuel in the filter casing 3, thereby preventing the clogging of the filtering element 4 with wax like material which will be produced at low temperature.

It is to be noted that the PTC heating element for heating the fuel used in the above-mentioned embodiment has a characteristic where as the temperature thereof increases, its resistance increases to decrease electric current flowing through the PTC heating element. Accordingly, the heating is carried out by the heating member 10 in a manner such as to prevent the fuel from being heated excessively to a point where ignition might take place. It will be appreciated that since the heating member 10 is disposed on the bottom wall surface of the filter casing 3, the fuel in the water sump 5 is uniformly heated by virtue of convection of heated fuel, thereby preventing the fuel from being locally heated at a high temperature.

The thus raised temperature of the fuel is transmitted to the bimetal switch 14. When the transmitted temperature exceeds a predetermined high temperature at which there is no fear that wax like material will be produced in the fuel, the switch 14 opens to its OFF position. Accordingly, the electric circuit for supplying electric current to the heating member 10 is opened to stop the heat generation of the heating member 10. On the contrary, when the temperature of the fuel is lowered below the predetermined low level, the heating circuit for the heating member 10 is closed to supply electric current to the heating member 10. By repetition of such operations, the temperature of the fuel within the filter casing 3 can be kept within a certain range to maintain the fluidity of the fuel in the filter casing 3.

Figure 4:
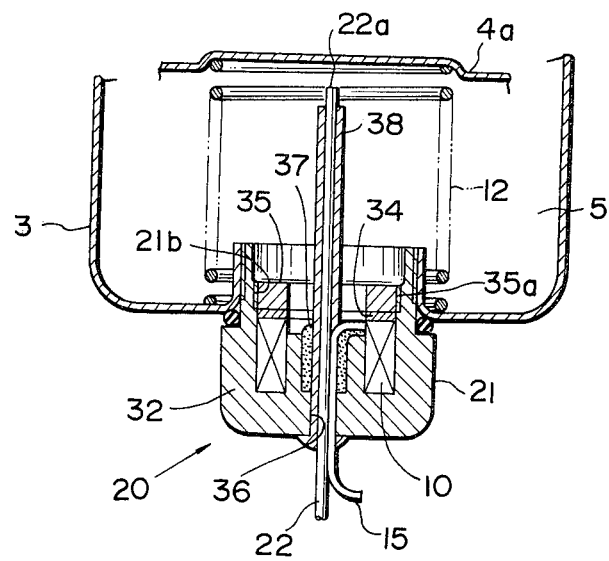
FIG. 4 is an enlarged sectional view of an essential part of another embodiment of the fuel filtering device in accordance with the present invention.

FIG. 4 illustrates another embodiment of the fuel filtering device according to the present invention, in which the grounded terminal member 21 is fixed to the bottom wall of the filter case 3 by being threaded therein. The terminal member 21 of this embodiment is in the shape of a cup and formed with an annular groove 32 within which the heating member 10 formed of gathered Positive Temperature Coefficient heating elements is securely disposed. An annular nut 35 has at its outer periphery a threaded section 35a which is engageable with a threaded section 21b formed at the inner wall surface of the terminal member 21. When the annular nut 35 is tightened, the heating member 10 is biased through a packing 34 so as to be secured within the annular groove 32 to form a single unit together with the terminal member 21. In this instance, the lead 22 is covered with an electrically insulative material 38 which is made of a plastic such as nylon, leaving the top end 22a exposed. The lead 15 from the heating member 10 is drawn out through a central through hole 36 of the terminal member 21 together with the lead 22. The reference numeral 37 denotes an electrically insulative adhesive to securely attach the leads 15 and 22 together to the central section of the grounded terminal member 21.

With this arrangement, since the heating member 10 is integrally assembled with the grounded terminal member 21 of the water level detecting device 20, it is rotatable together with the grounded terminal member 21 when the grounded terminal member 21 is turned during mounting or removal from the bottom wall of the filter casing 3, which prevents damage of the lead 15 due to twist thereof, and additionally facilitates mounting and removal operations. Although the distance between the exposed top end 22a of the lead 22 and the grounded terminal member 21 is considerably larger than in the embodiment of FIG. 2, it will be appreciated that the flow of electric current therebetween will not be blocked by this greater distance.

Figure 5:
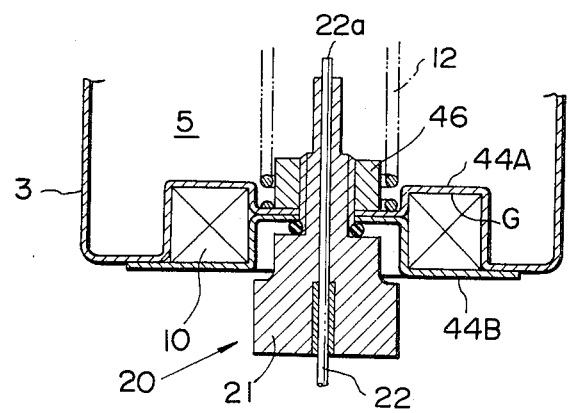
FIG. 5 is an enlarged sectional view of an essential part of a further embodiment of the fuel filtering device in accordance with the present invention.

FIG. 5 illustrates a further embodiment of the fuel filtering device in accordance with the present invention, which employs a double wall construction at the bottom section of the filter casing 3 so as to dispose the heating member 10 therebetween. The double wall construction includes a first bottom wall 44A which forms part of the filter casing 3, and a second bottom wall 44B which is not integral with the filter casing 3 but secured to the first bottom wall 44A. The first bottom wall 44A is formed into the shape having an annular groove G within which the heating member 10 is securely disposed under the action of the second bottom wall 44B. A cylindrical nut 46 is provided with a threaded section (no numeral) at its inner cylindrical surface which section engages with a threaded section of the upwardly elongage section 21a of the grounded terminal member 21 so that the terminal member is fixed onto the bottom wall section of the filter casing 3.

With this arrangement, fuel in the filter casing 3 is indirectly heated through the first bottom wall 44A by the heating member 10, and therefore an ignition of fuel in the filter case 3 is completely prevented, obtaining a securing electrical insulation of the heating member 10.

While the heating member in the afore-mentioned embodiments has been shown and described to be disposed only in the fuel filter assembly 1 in which a fuel filter section is incorporated with the a water separation section, it will be seen that the heating member may be disposed in the fuel filter section in a fuel filtering device of the type wherein the fuel filter section is disposed separately and independently from the water separation section, and otherwise may be disposed in the water separation section in case where the water separation section is located upstream of the fuel filter section.

Although the explanation of the present invention has been made on the fuel filtering device for light oil such as for example Diesel fuel, it will be understood that the present invention may be applicable to fuel filtering devices for other fuels having a high pour point, such as light oil mixed with kerosine. Additionally, the present invention may be also applicable to other fuel filtering devices for filtering high pour point fuels other than Diesel fuel.

As will be appreciated from the above, according to the present invention, a condition under which wax like material is produced due to low temperature in a fuel filtering device can be predicted, and then fuel in the filtering device is heated to maintain its suitable fluidity so as to prevent clogging of a filter element with the wax like material. Accordingly, a required amount of fuel can be effectively supplied to an engine, thereby preventing engine running deterioration, power output shortage, and engine stall.

What is claimed is:

1. A fuel filtering device for a Diesel engine, including a fuel filter assembly having therein a filtering element through which fuel flows, the improvement comprising: a heating member contained within said filter assembly and being operable when supplied with electric current to heat fuel in the fuel filter assembly, the resistance of said heating member to the flow of electric current therethrough being directly proportional to the temperature thereof; an electric circuit operable when closed to supply electric current to said heating member; and, a temperature sensor associated with said filtering device for sensing the temperature of fuel therein and for closing said electric circuit when said temperature is lower than a predetermined temperature.

2. A dual filtering device as claimed in claim 1, in which said heating member is disposed at the bottom section of the fuel filter assembly to heat the fuel at the bottom section of the fuel filter assembly.

3. A fuel filtering device as claimed in claim 2, in which said heating member is disposed within a casing of the fuel filter assembly so as to directly heat the fuel in the fuel filter assembly.

4. A fuel filtering device as claimed in claim 2, in which said heating member is disposed outside of a casing of the fuel filter assembly so as to indirectly heat the fuel in the fuel filter assembly through the wall of the casing.

5. A fuel filtering device as claimed in claim 1, further comprising means for detecting a predetermined amount of water accumulated in a casing of the fuel filter assembly.

6. A fuel filtering device as claimed in claim 5, in which said detecting means includes a terminal member which is grounded and secured at the bottom section of said casing, and an electrically conductive lead connected to an electric power source and vertically elongated from the bottom section of said casing by a distance corresponding to said predetermined amount of accumulated water, at least top end of said lead being exposed without being covered with an electrically insulating material.

7. A fuel filtering device as claimed in claim 6, in which said terminal member is detachable from the bottom section of said casing.

8. A fuel filtering device as claimed in claim 7, in which said heating member is incorporated with said terminal member to form a single unit.

* * * * *

UNITED STATES PATENT AND TRADEMARK OFFICE
CERTIFICATE OF CORRECTION

PATENT NO. : 4,321,136
DATED : March 23, 1982
INVENTOR(S) : Katsuhiko Matsui

It is certified that error appears in the above–identified patent and that said Letters Patent are hereby corrected as shown below:

IN THE CLAIMS:

Claim 2, column 6, line 18, delete "dual" and insert --fuel--.

Signed and Sealed this

Eighth Day of June 1982

|SEAL|

Attest:

GERALD J. MOSSINGHOFF

Attesting Officer    Commissioner of Patents and Trademarks